(12) United States Patent
Hu

(10) Patent No.: US 10,416,709 B2
(45) Date of Patent: Sep. 17, 2019

(54) PORTABLE ELECTRONIC DEVICE

(71) Applicant: Acer Incorporated, New Taipei (TW)

(72) Inventor: Li-Hua Hu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/151,375

(22) Filed: Oct. 4, 2018

(65) Prior Publication Data
US 2019/0171252 A1 Jun. 6, 2019

(30) Foreign Application Priority Data
Dec. 4, 2017 (TW) .............................. 106142356 A

(51) Int. Cl.
G06F 1/16 (2006.01)
H04N 5/225 (2006.01)
F16M 11/04 (2006.01)
G02B 7/02 (2006.01)

(52) U.S. Cl.
CPC ......... *G06F 1/1616* (2013.01); *F16M 11/048* (2013.01); *G02B 7/02* (2013.01); *G06F 1/1601* (2013.01); *G06F 1/1656* (2013.01); *H04N 5/2253* (2013.01); *H04N 5/2254* (2013.01); *H04N 5/2257* (2013.01)

(58) Field of Classification Search
CPC combination set(s) only.
See application file for complete search history.

(56) References Cited

U.S. PATENT DOCUMENTS

| 7,057,888 | B2 * | 6/2006 | Oakley | G06F 1/1601 |
| | | | | 361/679.23 |
| 8,384,518 | B2 * | 2/2013 | Krah | G06F 1/1616 |
| | | | | 340/7.51 |
| 8,814,447 | B1 * | 8/2014 | Hambergen | G03B 17/04 |
| | | | | 396/348 |
| 9,753,302 | B2 * | 9/2017 | Moriya | G03B 3/10 |
| 9,942,466 | B2 * | 4/2018 | Martin Perez | H04N 5/2253 |
| 10,084,948 | B2 * | 9/2018 | Yu | H04N 5/2257 |
| 10,234,909 | B2 * | 3/2019 | Youm | G06F 1/1686 |
| 2011/0236008 | A1 * | 9/2011 | Kang | G03B 3/10 |
| | | | | 396/133 |
| 2011/0281618 | A1 * | 11/2011 | Chambers | H04M 1/0264 |
| | | | | 455/556.1 |
| 2014/0101578 | A1 * | 4/2014 | Kwak | G06F 3/017 |
| | | | | 715/761 |
| 2018/0364494 | A1 * | 12/2018 | Masahiro | H04N 5/2253 |
| 2018/0373122 | A1 * | 12/2018 | Cavallaro | G03B 11/041 |
| 2019/0033927 | A1 * | 1/2019 | Youm | G06F 1/1686 |
| 2019/0068852 | A1 * | 2/2019 | Kang | H04N 5/2257 |

* cited by examiner

*Primary Examiner* — Lisa Lea-Edmonds
(74) *Attorney, Agent, or Firm* — McClure, Qualey & Rodack, LLP

(57) ABSTRACT

A portable electronic device is provided. The portable electronic device includes an input module, a display module, and a lens module disposed on the display module. The lens module includes a housing, a rear lens, a first elastic member, and a first magnetic member. The rear lens and the first elastic member are disposed in the housing, and the first elastic member is connected to the rear lens and the first magnetic member. A second magnetic member is disposed on the input module and corresponds to the first magnetic member.

11 Claims, 13 Drawing Sheets

PORTABLE ELECTRONIC DEVICE

CROSS REFERENCE TO RELATED APPLICATIONS

The present application is based on, and claims priority from, Taiwan Patent Application No. 106142356, filed on Dec. 4, 2017, the disclosure of which is hereby incorporated by reference herein in its entirety.

BACKGROUND OF THE INVENTION

Field of the Invention

The application relates in general to a portable electronic device, and in particular, to a portable electronic device having a lens which is telescopic by an elastic member and a magnetic member.

Description of the Related Art

With the progress of technology in research and development of computer, the computing speed and the performance of the portable electronic device (such as the notebook computer) are greatly increased. The speaker and the Bluetooth device can be integrated into the portable electronic device, and the lens module for photographing or having a video conference can also be disposed thereon. However, the lens module in the conventional portable electronic device having the lens module is inserted in the display module. Since the position of the lens in the lens module is affixed, the visual angle is limited, which is inconvenient.

BRIEF SUMMARY OF INVENTION

To address the deficiencies of conventional products, an embodiment of the invention provides a portable electronic device, including an input module, a display module and a lens module disposed on the display module. The lens module includes a housing, a rear lens, a first elastic member and a first magnetic member. The rear lens and the first elastic member are disposed in the housing, and the first elastic member is connected to the rear lens and the first magnetic member. A second magnetic member is disposed on the input module and corresponds to the first magnetic member. When the portable electronic device is in an unfolded state, the first magnetic member is away from the second magnetic member, and the first elastic element pushes the rear lens to protrude from the housing by the elastic force. When the portable electronic device is in a folded state, the first magnetic member is adjacent to the second magnetic member to generate the magnetic force retracting the rear lens into the frame.

In some embodiments, wherein when the portable electronic device is in the folded state, the direction of the magnetic pole of the first magnetic member is the same as the direction of the magnetic pole of the second magnetic member.

In some embodiments, wherein the lens module further comprises a front lens, a second elastic member, and a third magnetic member. The front lens is disposed in the housing. The second elastic member is disposed in the housing and connected to the front lens. The third magnetic member is disposed on the second elastic member. The portable electronic device further comprises a fourth magnetic member, disposed on the input module and corresponding to the third magnetic member. When the portable electronic device is in the unfolded state, the third magnetic member is away from the fourth magnetic member, and the second elastic member pushes the front lens to protrude from the housing by the elastic force. When the portable electronic device is in the folded state, the third magnetic member is adjacent to the fourth magnetic member to generate the magnetic force retracting the front lens into the housing.

In some embodiments, when the portable electronic device is in the unfolded state, the direction of the magnetic pole of the third magnetic member is opposite to the direction of the magnetic pole of the fourth magnetic member.

In some embodiments, the display module comprises a frame. The lens module is disposed on the frame. The portable electronic device comprises a third elastic member, a fourth elastic member, a fifth magnetic member, a sixth magnetic member, a seventh magnetic member, and an eighth magnetic member. The third elastic member is disposed on the frame and connected to the lens module. The fourth elastic member is disposed on the frame and connected to the lens module, wherein the third elastic member and the fourth elastic member are disposed on opposite sides of the lens module. The fifth magnetic member is disposed on the third elastic member. The sixth magnetic member is disposed on the input module and corresponds to the fifth magnetic member. The seventh magnetic member is disposed on the fourth elastic member. The eighth magnetic member is disposed on the input module and corresponds to the seventh magnetic member. When the portable electronic device is in the unfolded state, the fifth magnetic member and the seventh magnetic member are respectively away from the sixth magnetic member and the eighth magnetic member, and the third elastic member and the fourth elastic member push the lens module to protrude from the frame by the elastic forces. When the portable electronic device is in the folded state, the fifth magnetic member and the seventh magnetic member are respectively adjacent to the sixth magnetic member and the eighth magnetic member to generate the magnetic forces retracting the lens module into the frame.

In some embodiments, the direction of the magnetic pole of the fifth magnetic member is opposite to the direction of the magnetic pole of the sixth magnetic member.

In some embodiments, the direction of the magnetic pole of the seventh magnetic member is opposite to the direction of the magnetic pole of the eighth magnetic member.

In some embodiments, when the portable electronic device is in the unfolded state, the lens module protrudes from the frame toward the front lens by the elastic forces from the third elastic member and the fourth elastic member.

In some embodiments, when the portable electronic device is in the folded state, the lens module is retracted into the frame toward the rear lens by the magnetic force between the fifth magnetic member and the sixth magnetic member and the magnetic force between the seventh magnetic member and the eighth magnetic member.

In some embodiments, the first elastic member, the second elastic member, the third elastic member, or the fourth elastic member is a metal sheet.

In some embodiments, the first magnetic member, the second magnetic member, the third magnetic member, the fourth magnetic member, the fifth magnetic member, the sixth magnetic member, the seventh magnetic member, or the eighth magnetic member is a permanent magnet.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1A:
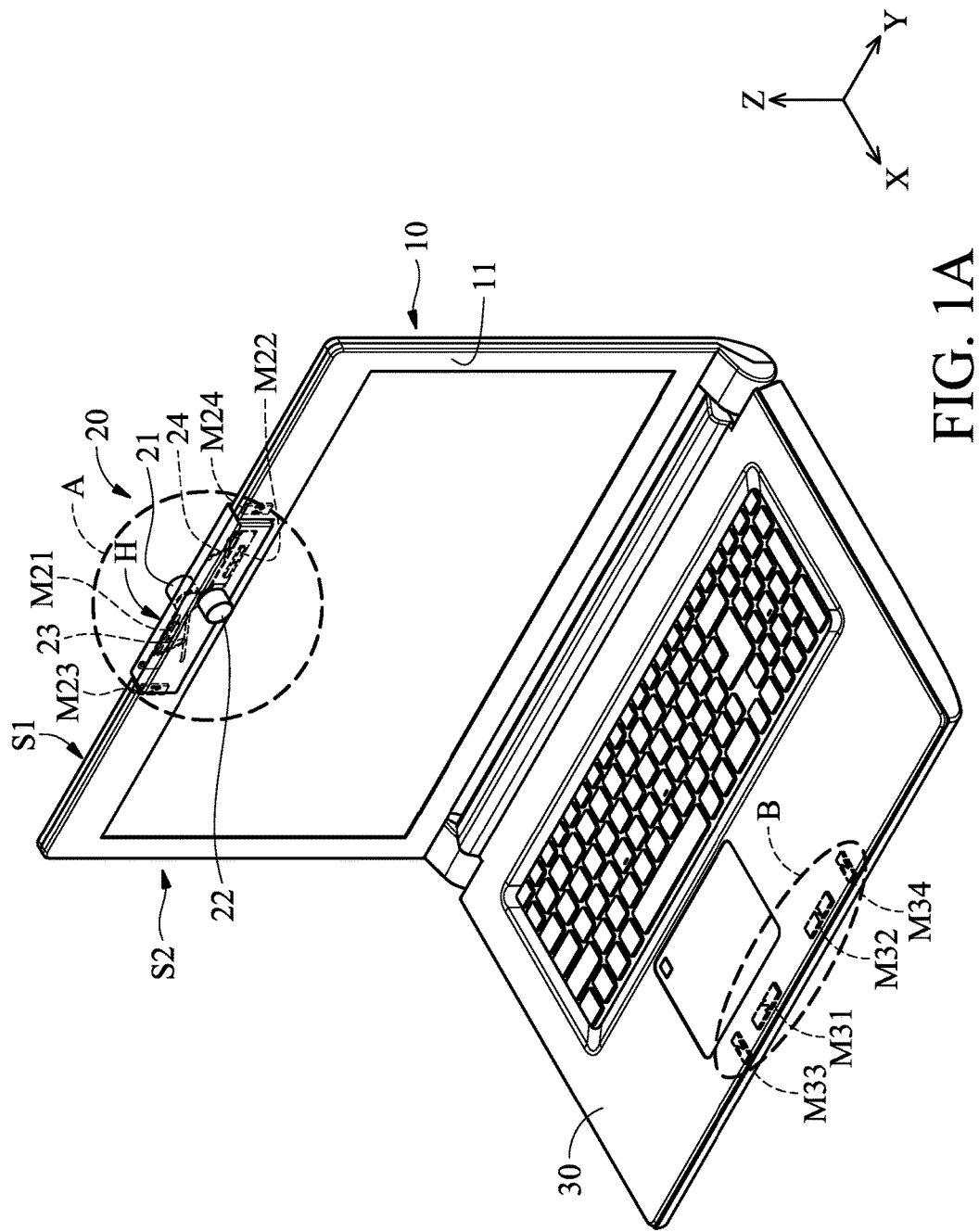
FIG. 1A is a schematic diagram of a portable electronic device in an unfolded state according to an embodiment of the invention.

The embodiment of present invention will be described herein with attached figures.

The aforementioned and other technical contents, features and effects relating to the present invention are clearly shown in the description of a preferred embodiment with reference figures. The directional phrases, such as on, under, left, right, front, or rear are the directions relative to the reference figures. As a result, the directional phrases are used only for illustration and are not intended to restrict this invention.

In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

It should be understood that, although the terms "first", "second", "third" etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure. The terms "first", "second", "third" etc., are intended to designate a name but not to suggest any specific order.

FIG. 1A is a schematic diagram of a portable electronic device 1 in an unfolded state according to an embodiment of the invention. Referring to FIG. 1A, the portable electronic device 1 can be a notebook computer, for example, and primarily comprises a display module 10, a lens module 20, and an input module 30. The display module 10 comprises a frame 11, and a display panel for displaying image is disposed therein. The display panel can be a liquid-crystal display (LCD) panel or an organic light-emitting diode (OLED) panel, for example. The input module 30 has a plate-shaped structure, and a keyboard or a touchpad can be disposed on a surface of the input module 30 facing the display module 10. Various electronic members (not shown) can be disposed inside the input module 30, such as a central processing unit (CPU) and at least one memory. The display module 10 is pivotally connected to the input module 30. The display module 10 is rotatable relative to the input module 30, so as to put the portable electronic device 1 into an unfolded state or a folded state.

Figure 1B:
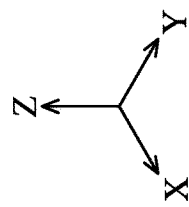
FIG. 1B is an enlarged schematic diagram of region A in FIG. 1A.
Figure 1B:
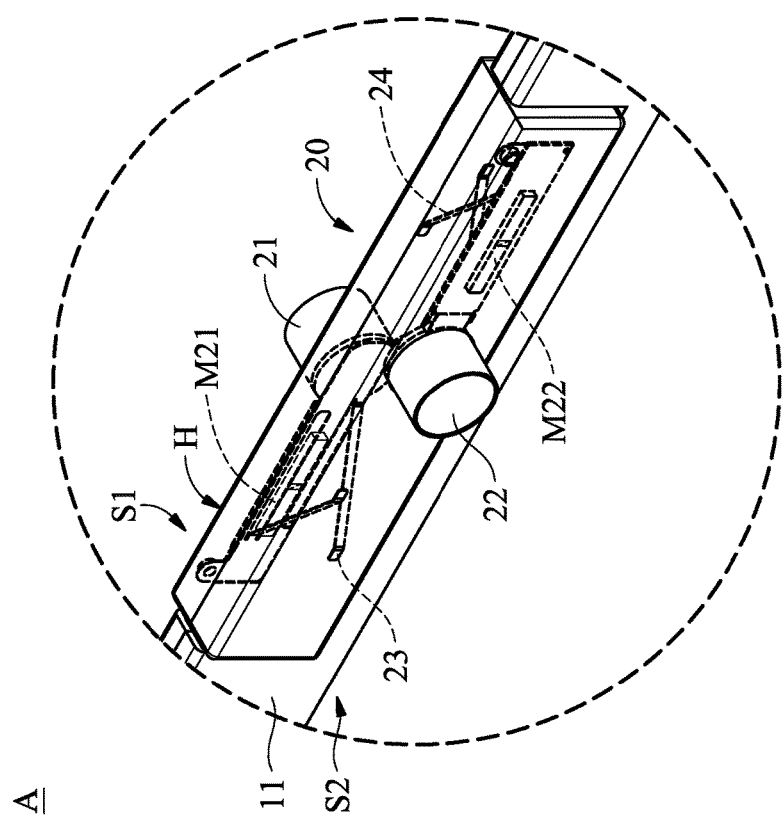

FIG. 1B is an enlarged schematic diagram of region A in FIG. 1A. Referring to FIG. 1B, the lens module 20 is disposed on the frame 11 of the display module 10, and comprises a housing H, a rear lens 21, a front lens 22, a first elastic member 23, a second elastic member 24, a first magnetic member M21, and a third magnetic member M22. The rear lens 21, the front lens 22, the first elastic member 23, the second elastic member 24, the first magnetic member M21, and the third magnetic member M22 are disposed in the housing H. The rear lens 21 and the front lens 22 are respectively used to photograph the sight at a first side Si of the display module 10 away from the input module 30 and the sight at a second side S2 of the display module facing the input module 30. Two legs of the first elastic member 23 abut the inner wall of the housing H, and another end of the first elastic member 23 is connected to the rear lens 21. Two legs of the second elastic member 24 abut the inner wall of the housing H, and another end of the second elastic member 24 is connected to the front lens 22. Furthermore, the first magnetic member M21 and the third magnetic member M22 are respectively disposed on the first elastic member 23 and the second elastic member 24.

Figure 1C:
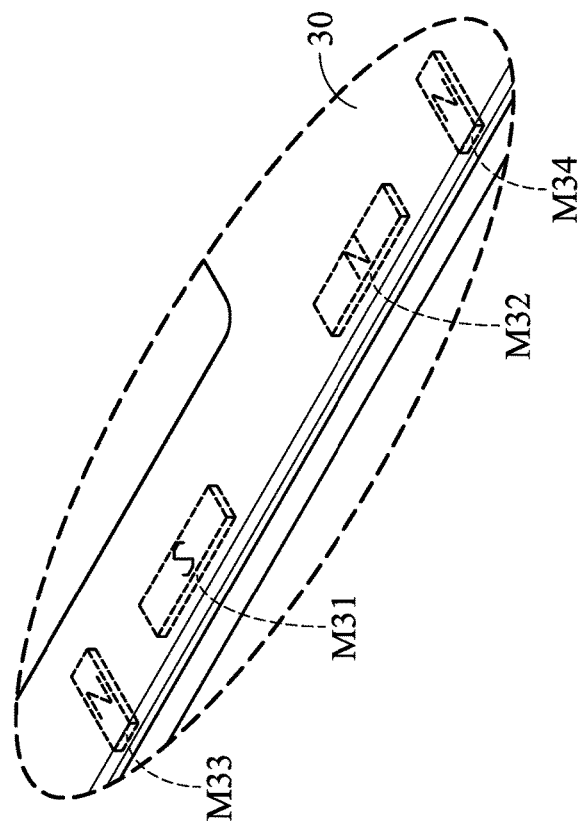
FIG. 1C is an enlarged schematic diagram of region B in FIG. 1A.

FIG. 1C is an enlarged schematic diagram of region B in FIG. 1A. Referring to FIG. 1C, the portable electronic device 1 further comprises a second magnetic member M31, a fourth magnetic member M32, a sixth magnetic member M33, and an eighth magnetic member M34, disposed on the input module 30. It should be noted that the second magnetic member M31 and the fourth magnetic member M32 respectively correspond to the first magnetic member M21 and the third magnetic member M22.

Figure 2:
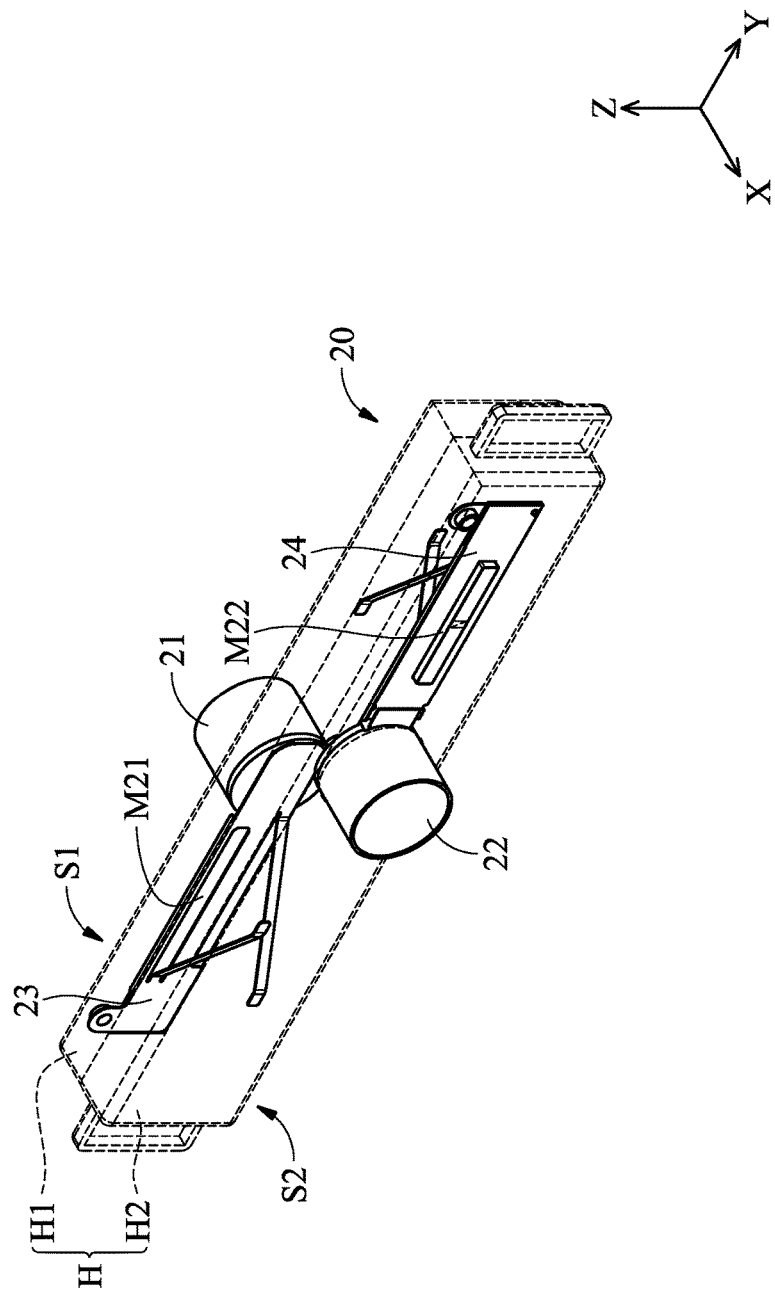
FIG. 2 is a schematic diagram of the rear lens, the front lens, the first elastic member, the second elastic member, the first magnetic member, and the third magnetic member in FIG. 1A.

FIG. 2 is a schematic diagram of the rear lens 21, the front lens 22, the first elastic member 23, the second elastic member 24, the first magnetic member M21, and the third magnetic member M22 in FIG. 1A. Referring to FIGS. 1A and 2, when the portable electronic device 1 is in the unfolded state, the first magnetic member M21 is away from the second magnetic member M31 (as shown in FIG. 1A). The magnetic force between the first magnetic member M21 and the second magnetic member M31 does not affect the first elastic member 23. The first elastic member 23 can provide an elastic force to the rear lens 21, and the rear lens 21 protrudes from the outer member H1 of the housing H toward the first side S1 (the direction of X-axis), as shown in FIG. 2.

As shown in FIG. 1A, when the portable electronic device 1 is in the unfolded state, the third magnetic member M22 is away from the fourth magnetic member M32. The magnetic force between the third magnetic member M22 and the fourth magnetic member M32 does not affect the second elastic member 24. The second elastic member 24 can provide an elastic force to the front lens 22, and the front lens 22 protrudes from the inner member H2 of the housing H toward the second side S2 (the direction of X-axis), as shown in FIG. 2. In this embodiment, the first elastic member 23 or the second elastic member 24 can be a metal sheet, but they are not limited thereto.

Figure 3A:
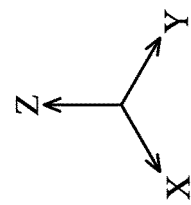
FIG. 3A is a schematic diagram of a portable electronic device shown in FIG. 1A in an unfolded state.
Figure 3A:
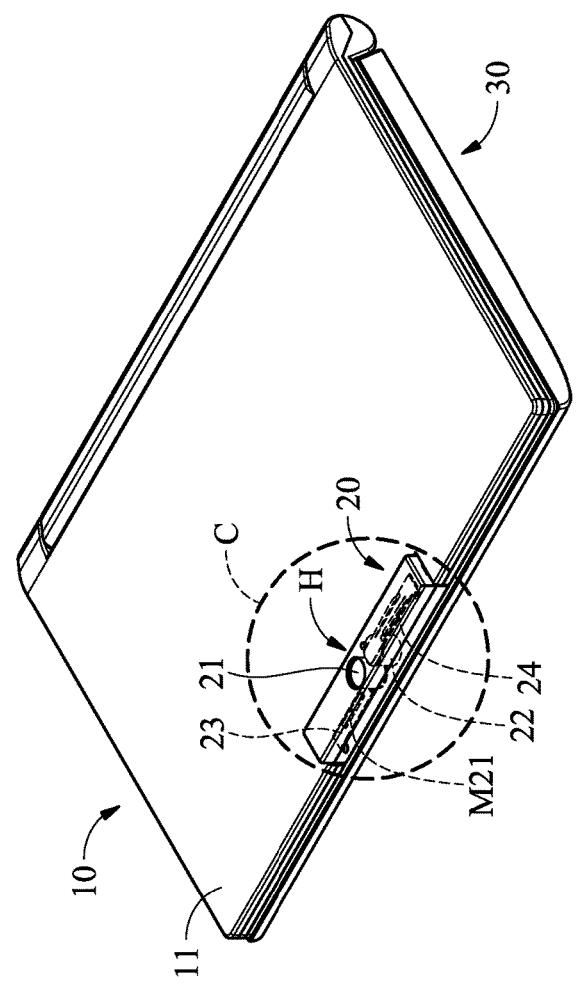
Figure 3B:
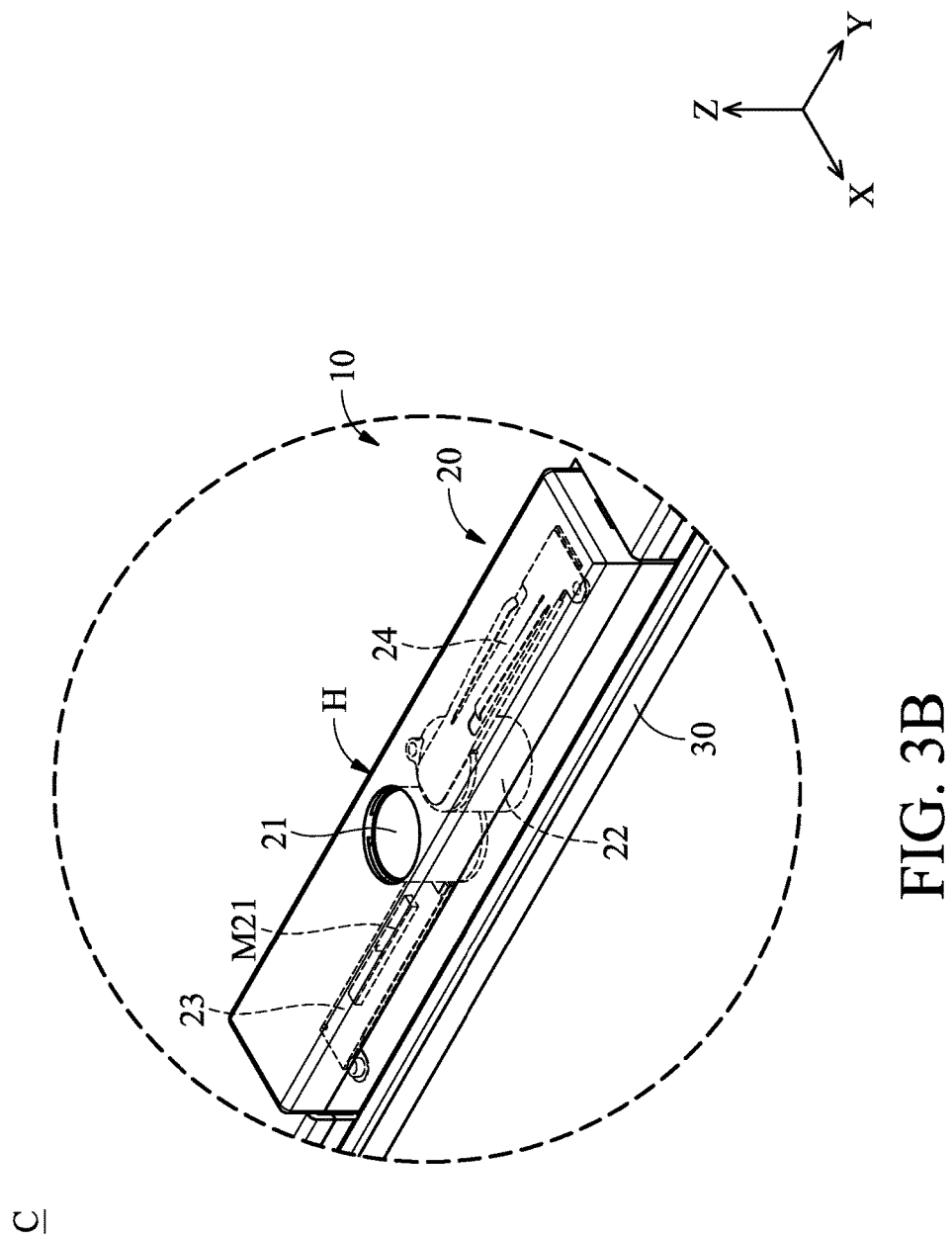
FIG. 3B is an enlarged schematic diagram of region C in FIG. 3A.
Figure 4:
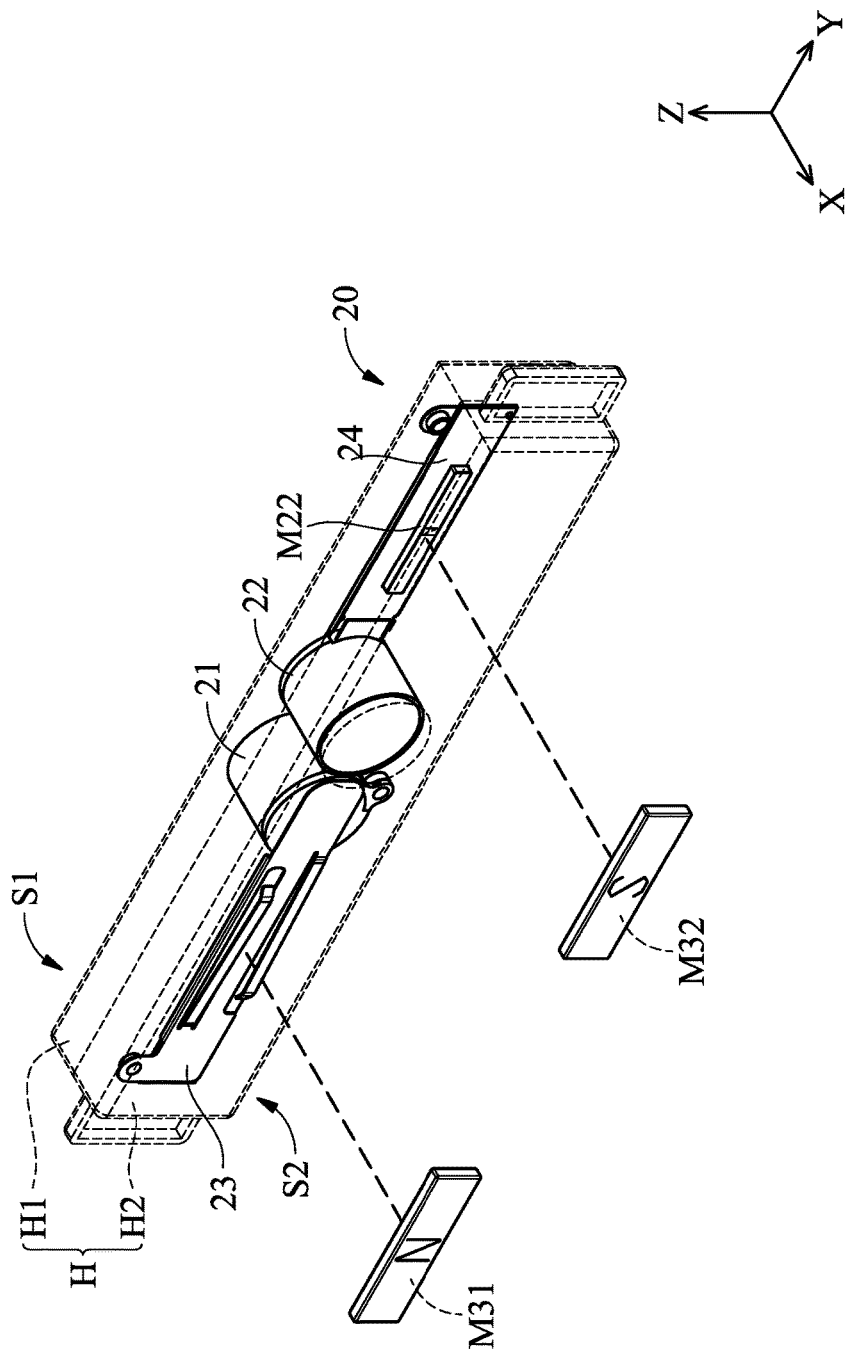
FIG. 4 is a schematic diagram of the rear lens, the front lens, the first elastic member, the second elastic member, the first magnetic member, the second magnetic member, and the third magnetic member in FIG. 3A.

FIG. 3A is a schematic diagram of a portable electronic device 1 in an unfolded state, FIG. 3B is an enlarged partial schematic diagram thereof, and FIG. 4 is a schematic diagram thereof. As shown in FIG. 3A, when the portable electronic device 1 is in the folded state, the first magnetic member M21 is adjacent to the second magnetic member M31. The first elastic member 23 is affected by the magnetic attraction force between the first magnetic member M21 and the second magnetic member M31. Thus, the first elastic member 23 can be compressed and drives the rear lens 21 to retract into the outer member H1 of the housing H toward the second side S2, as shown in FIGS. 3B and 4.

Referring to FIGS. 3A, 3B and 4, when the portable electronic device 1 is in the folded state, the third magnetic member M22 is adjacent to the fourth magnetic member M32. The second elastic member 24 is affected by the magnetic attraction force between the third magnetic member M22 and the fourth magnetic member M32. Thus, the second elastic member 24 can be compressed and drives the front lens 22 to retract into the inner member H2 of the housing H toward the first side S2, as shown in FIGS. 3B and 4.

Figure 5:
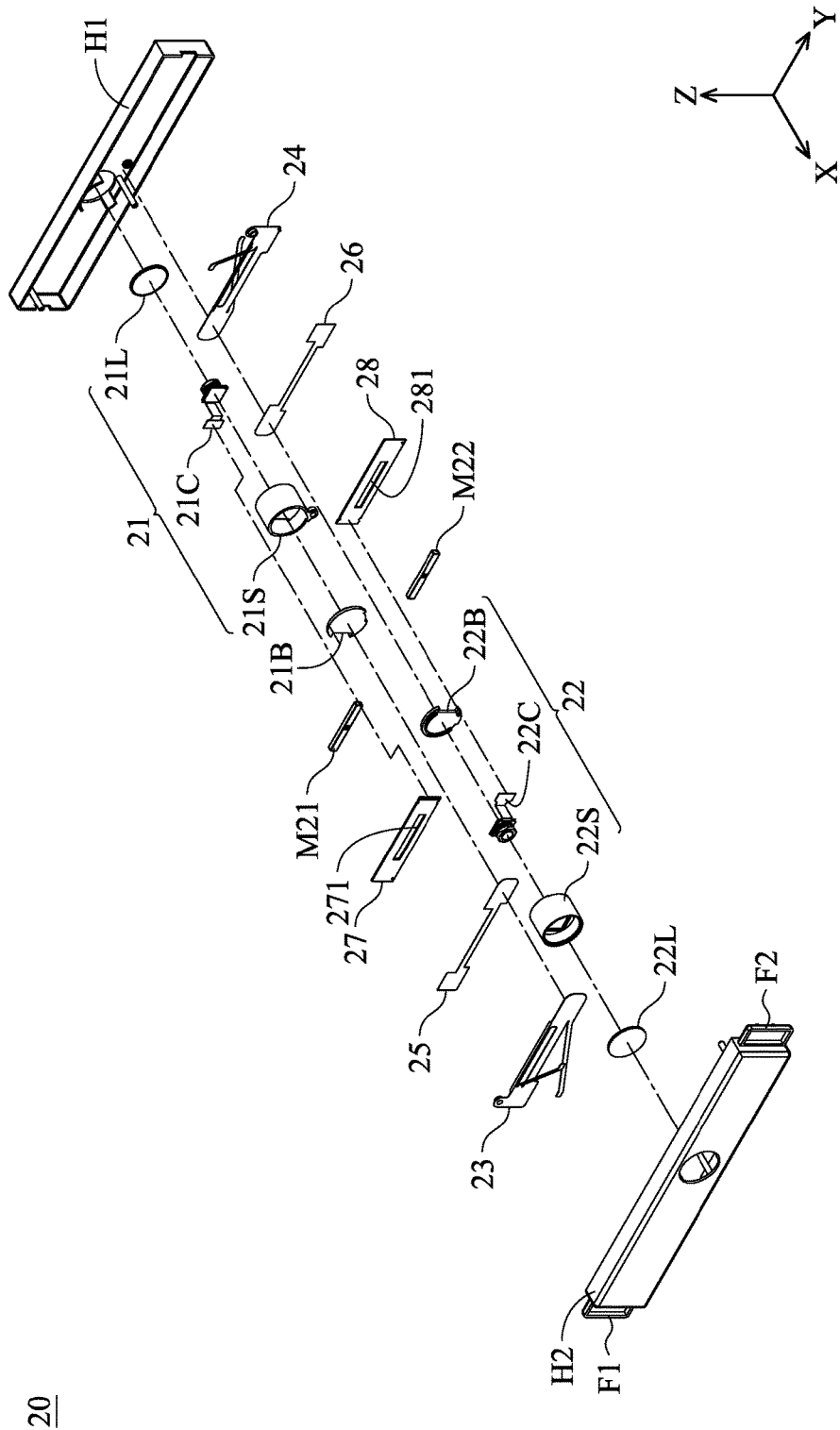
FIG. 5 is an exploded diagram of the portable electronic device shown in FIG. 1A.

FIG. 5 is an exploded-view diagram of the lens module 20 shown in FIG. 1A. Referring to FIG. 5, the lens module 20 further comprises a first glue 25, a second glue 26, a first circuit board 27, and a second circuit board 28. The rear lens 21 includes a rear lens cover 21B, a rear lens housing 21S, a rear lens optical member 21C, and a rear lens glass 21L. The rear lens optical member 21C is disposed in the rear lens housing 21S. The rear lens glass 21L is disposed on an end of the rear lens housing 21S adjacent to the outer member H1. The rear lens cover 21B is disposed on another end of the rear lens housing 21S away from the outer member H1. The first circuit board 27 is electrically connected to the rear lens optical member 21C, and forms an opening 271 used to accommodate the first magnetic member M21. The first glue 25 is used to attach the rear lens 21, the first magnetic member M21, and the first circuit board 27 to the first elastic member 23.

Referring to FIG. 5, the front lens 22 includes a front lens cover 22B, a front lens housing 22S, a front lens optical member 22C, and a front lens glass 22L. The front lens optical member 22C is disposed in the front lens housing 22S. The front lens glass 22L is disposed on an end of the front lens housing 22S adjacent to the inner member H2. The front lens cover 22B is disposed on another end of the front lens housing 22S away from the inner member H2. The second circuit board 28 is electrically connected to the front lens optical member 22C, and forms an opening 281 used to accommodate the third magnetic member M22. The second glue 26 is used to attach the front lens 22, the third magnetic member M22, and the second circuit board 28 to the second elastic member 24. In should be noted that, the inner member H2 of the housing H includes a first frame F1 and a second F2, respectively used to accommodate a fifth magnetic member M23 and a seventh magnetic member M24.

Figure 6A:
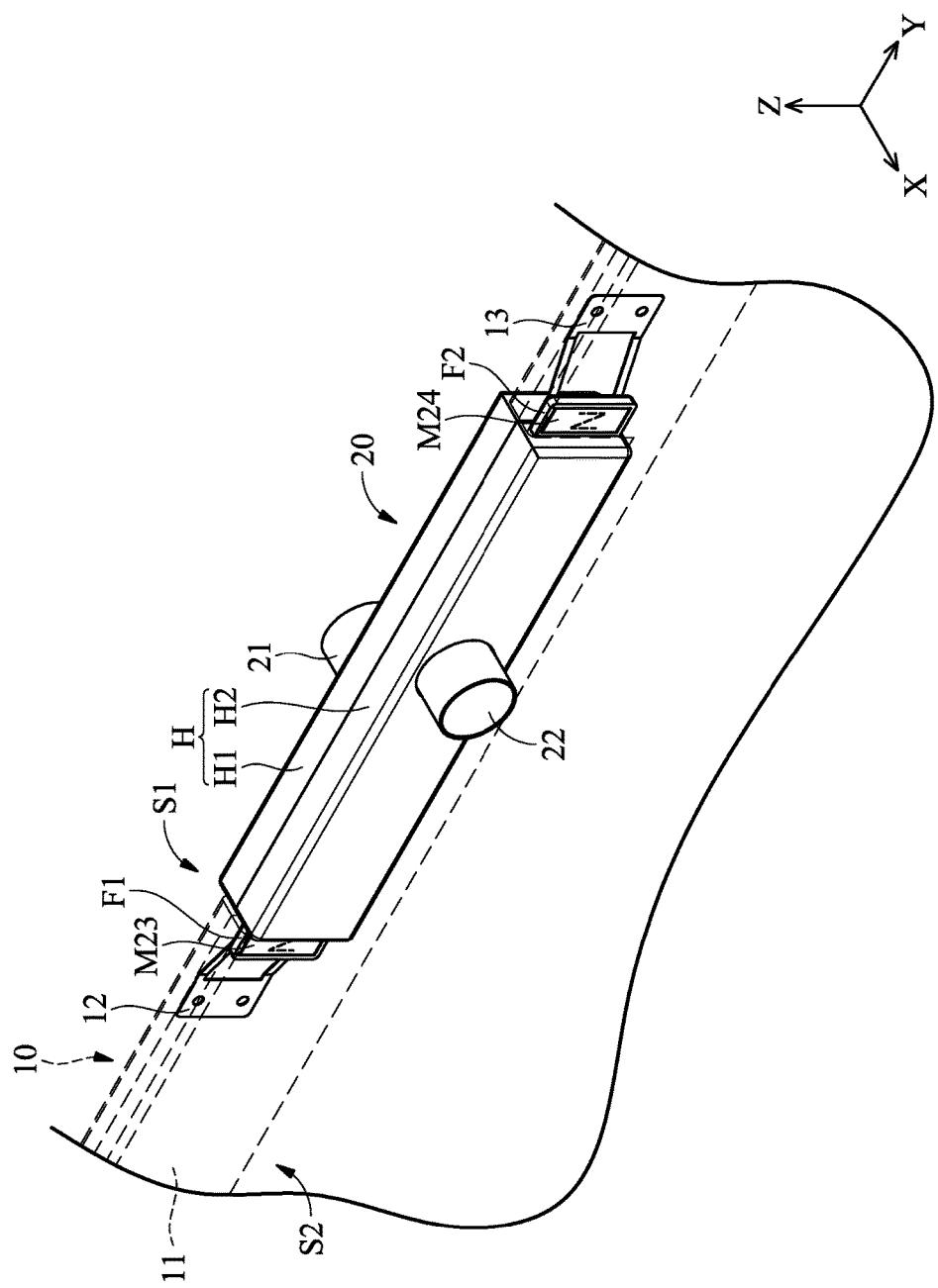
FIG. 6A is a schematic diagram of the lens module, the third elastic member, the fourth elastic member, the fifth magnetic member, and the seventh magnetic member shown in FIG. 1A.

FIG. 6A is a schematic diagram of the lens module 20, a third elastic member 12, a fourth elastic member 13, the fifth magnetic member M23, and the seventh magnetic member M24 shown in FIG. 1A. As shown in FIG. 6A, the portable electronic device 1 further comprises the third elastic member 12, the fourth elastic member 13, the fifth magnetic member M23, and the seventh magnetic member M24, wherein the third elastic member 12 is disposed on the frame 11 and connected to the housing H of the lens module 20, and the fourth elastic member 13 is disposed on the frame 11 and connected to the housing H of the lens module 20. Moreover, the fifth magnetic member M23 is disposed in the first frame F1 and situated on the third elastic member 12, and the seventh magnetic member M24 is disposed in the second frame F2 and situated on the fourth elastic member 13. In this embodiment, the sixth magnetic member M33 and the eighth magnetic member M34 (as shown in FIG. 1C) respectively correspond to the fifth magnetic member M23 and the seventh magnetic member M24.

As shown in FIGS. 1A and 6A, since the fifth magnetic member M23 is away from the sixth magnetic member M33 when the portable electronic device 1 is in the unfolded state, the magnetic force between the fifth magnetic member M23 and the sixth magnetic member M33 does not affect the third elastic member 12. Since the seventh magnetic member M24 is away from the eighth magnetic member M34 when the portable electronic device 1 is in the unfolded state, the magnetic force between the seventh magnetic member M24 and the eighth magnetic member M34 does not affect the fourth elastic member 13. Therefore, the third elastic member 12 and the fourth elastic member 13 can respectively provide an elastic force to the lens module 20, and the lens module 20 protrudes from the frame 11 toward the front lens 22 (the second side S2).

Figure 6B:
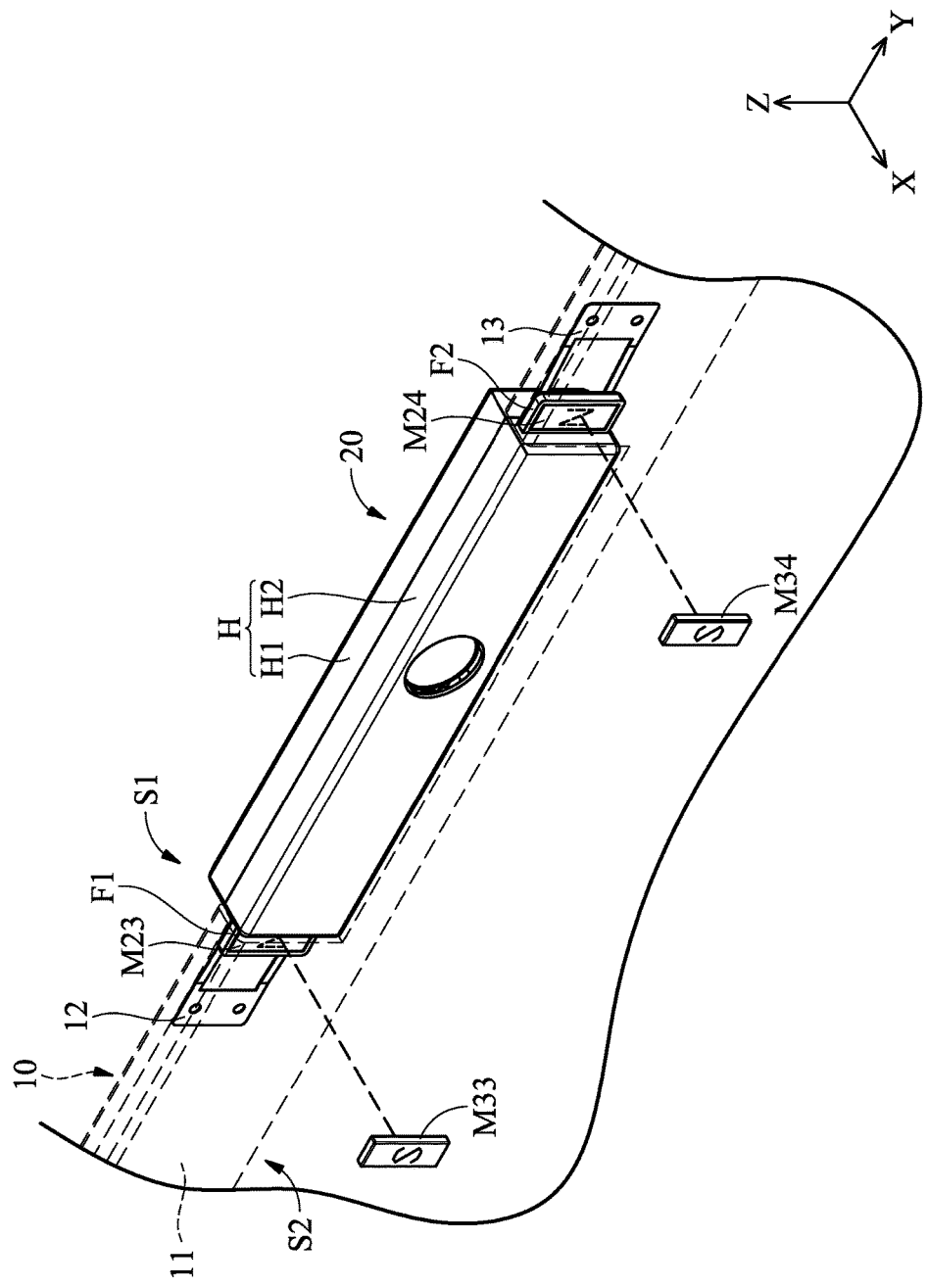
FIG. 6B is a schematic diagram of the lens module, the third elastic member, the fourth elastic member, the fifth magnetic member, the sixth magnetic member, the seventh magnetic member, and the eighth magnetic member shown in FIG. 3A.

FIG. 6B is a schematic diagram of the lens module 20, the third elastic member 12, the fourth elastic member 13, the fifth magnetic member M23, the sixth magnetic member M33, the seventh magnetic member M24, and the eighth magnetic member M34 shown in FIG. 3A. Referring to FIG. 6B, since the fifth magnetic member M23 is adjacent to the sixth magnetic member M33 when the portable electronic device 1 is in the folded state, the third elastic member 12 is affected by the magnetic repulsion force between the fifth magnetic member M23 and the sixth magnetic member M33. Since the seventh magnetic member M24 is adjacent to the eighth magnetic member M34 when the portable electronic device 1 is in the folded state, the fourth elastic member 13 is affected by the magnetic repulsion force between the seventh magnetic member M24 and the eighth magnetic member M34. Therefore, the third elastic member 12 and the fourth elastic member 13 can drive the lens module 20 to retract into the frame 11 toward the rear lens 22 (the first side 51). In this embodiment, the third elastic member 12 or the fourth elastic member 13 can be a metal sheet, but they are not limited thereto.

Figure 7:
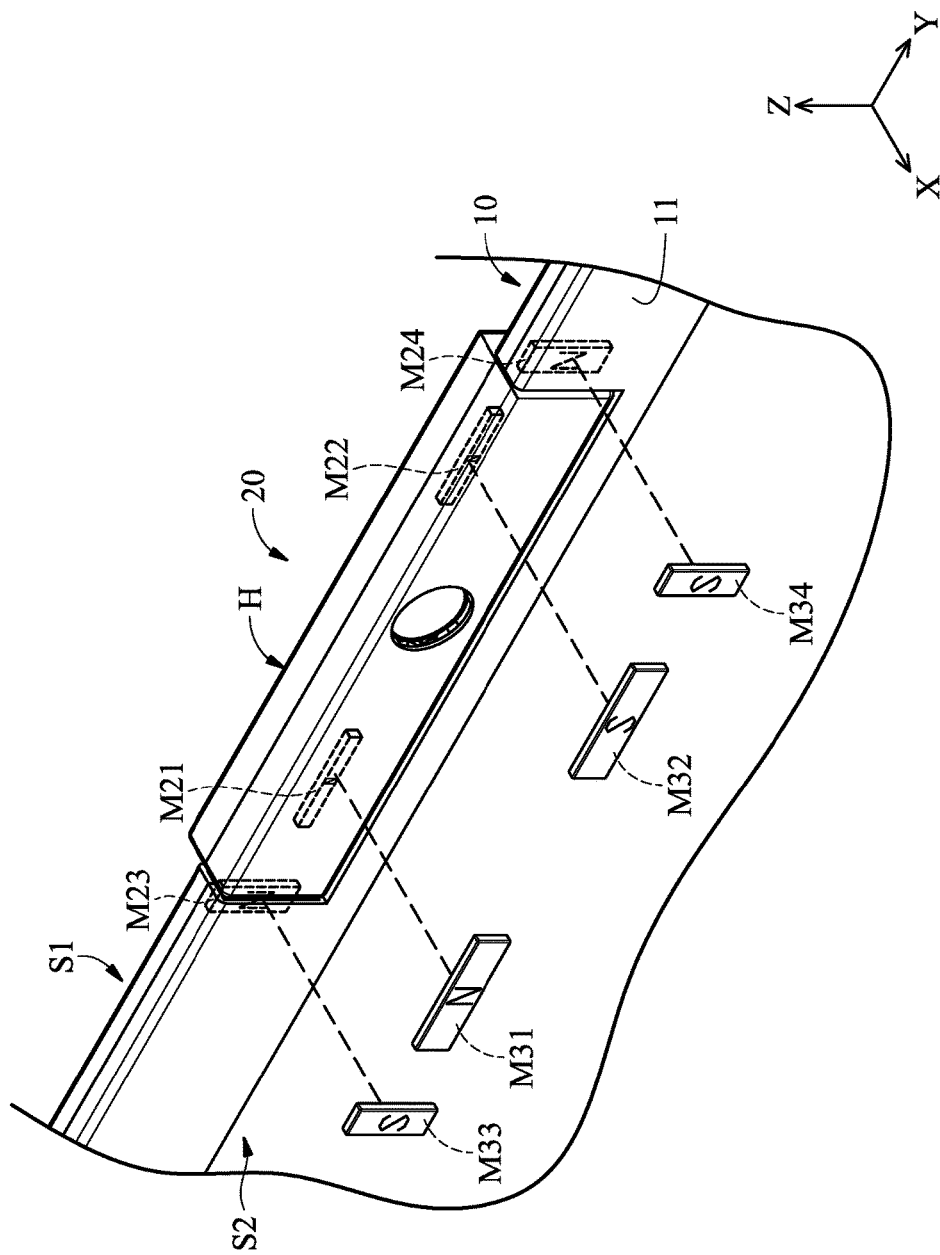
FIG. 7 is a schematic diagram of the relative positions of the first magnetic member, the second magnetic member, the third magnetic member, the fourth magnetic member, the fifth magnetic member, the sixth magnetic member, the seventh magnetic member, and the eighth magnetic member in FIG. 3A.

FIG. 7 is a schematic diagram of the relative positions of the first magnetic member M21, the second magnetic member M31, the third magnetic member M22, the fourth magnetic member M32, the fifth magnetic member M23, the sixth magnetic member M33, the seventh magnetic member M24, and the eighth magnetic member M34 in FIG. 3A. Since the direction of the magnetic pole of the first magnetic member M21 is the same as that of the second magnetic member M31, when the portable electronic device 1 is in the folded state, the first elastic member 23 is affected by the magnetic attraction force between the first magnetic member M21 and the second magnetic member M31 and becomes compressed, and the rear lens 21 can be retracted into the housing H. Similarly, since the direction of the magnetic poles of the third magnetic member M22, the fifth magnetic member M23, and the seventh magnetic member M24 are opposite to that of the fourth magnetic member M32, the sixth magnetic member M33, and the eighth magnetic member M34, when the portable electronic device 1 is in the folded state, the second elastic member 24, the third elastic member 12, and the fourth elastic member 13 are respectively affected by the magnetic repulsion force between the third magnetic member M22 and the fourth magnetic member M32, the magnetic repulsion force between the fifth magnetic member M23 and the sixth magnetic member M33, and the magnetic repulsion force between the seventh magnetic member M24 and the eighth magnetic member M34, and become compressed. The front lens 22 can be retracted into the housing H, and the lens module 20 can be retracted into the frame 11. In this embodiment, the first magnetic member M21, the second magnetic member M31, the third magnetic member M22, the fourth magnetic member M32, the fifth magnetic member M23, the sixth magnetic member M33, the seventh magnetic member M24, and the eighth magnetic member M34 can be permanent magnets, but are not limited thereto.

Figure 8A:
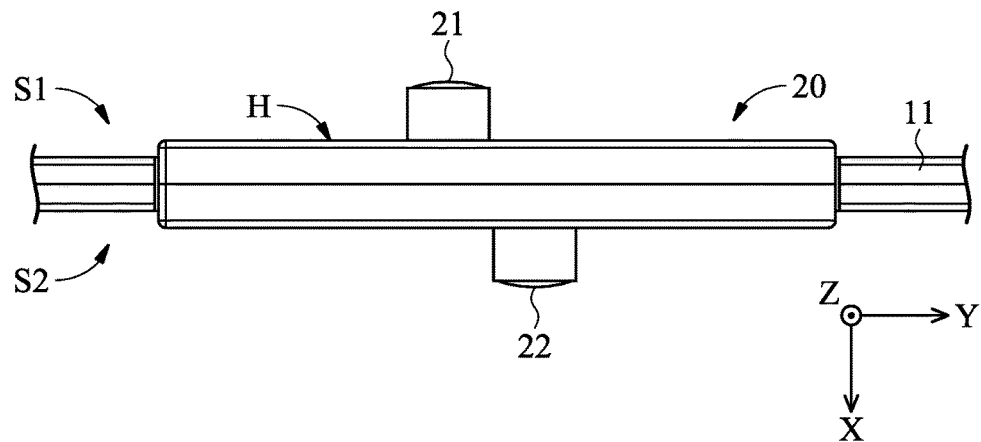
FIG. 8A is a partial schematic diagram of the lens module shown in FIG. 1.
Figure 8B:
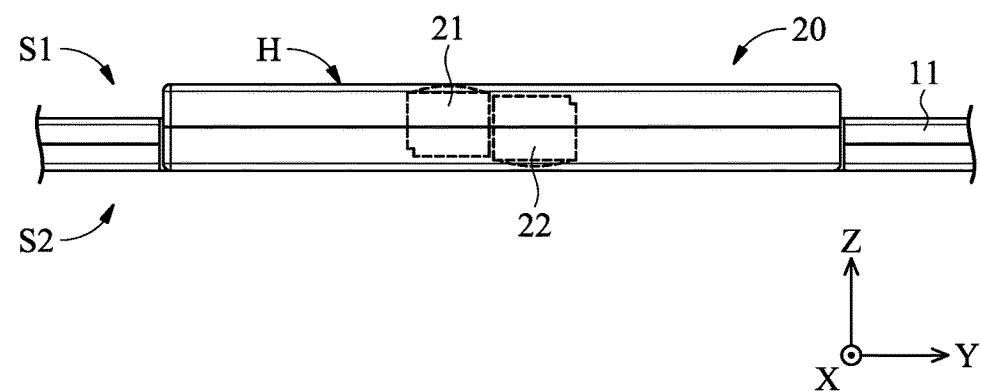
FIG. 8B is a partial schematic diagram of the lens module shown in FIG. 3A.
Figure 9:
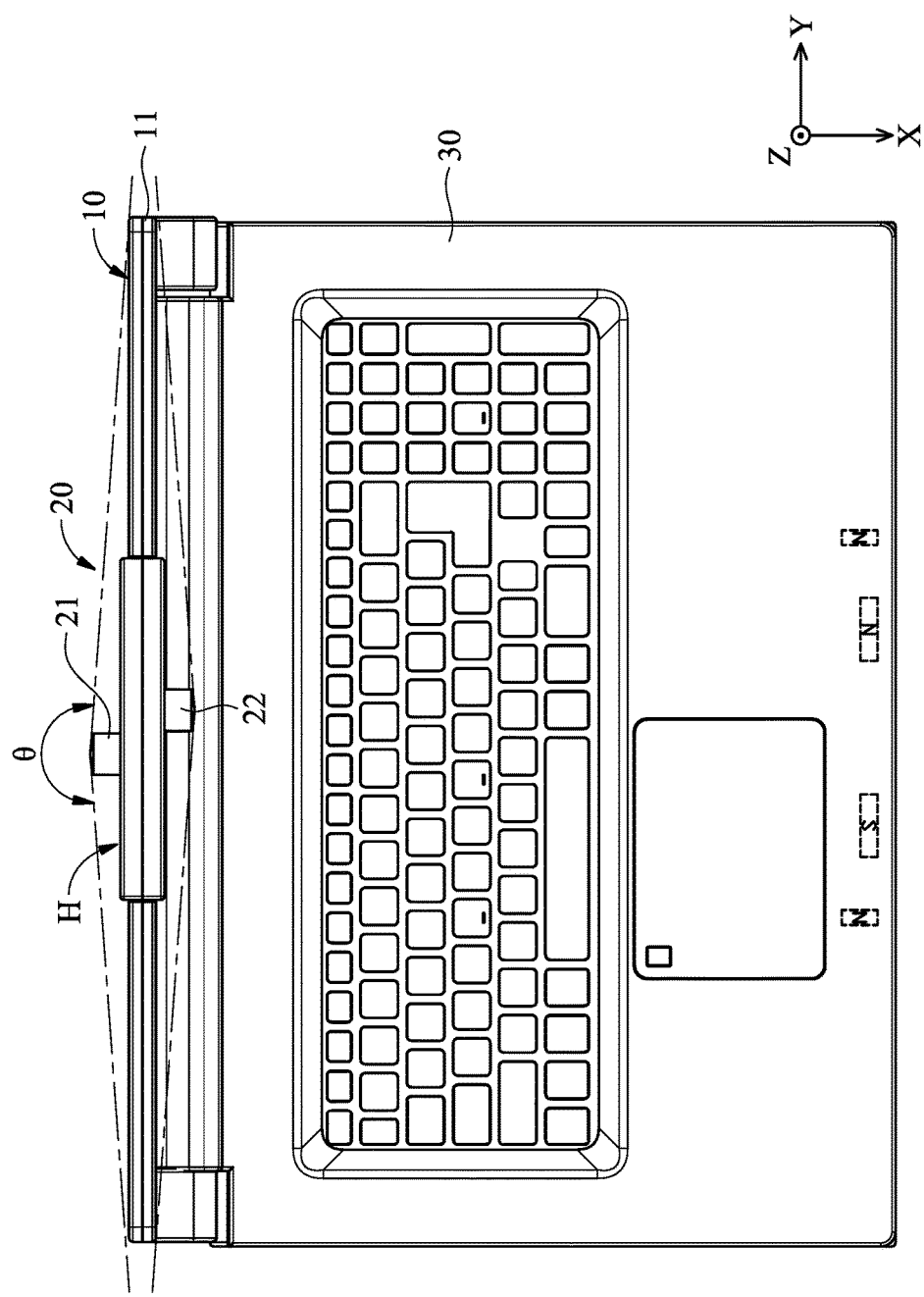
FIG. 9 is a top view of the portable electronic device 1 in FIG. 1.

FIG. 8A is a partial schematic diagram of the lens module 20 in the unfolded state shown in FIG. 1, FIG. 8B is a partial schematic diagram of the lens module 20 in the folded state shown in FIG. 3A, and FIG. 9 is a top view of the portable electronic device 1 in FIG. 1. As shown in FIG. 8A, when the portable electronic device in 1 is in the unfolded state, the rear lens 21 and the front lens 22 can respectively protrude from the housing H of the lens module 20 toward the first side S1 and second side S2 by the structure in the aforementioned embodiment. Simultaneously, the lens module 20 can protrude from the frame 11 toward the rear lens 21 (the second side S2) by the structure in the aforementioned embodiment. Therefore, as shown in FIG. 9, the rear lens 21 and the front lens 22 can photograph the sight with an angle θ, wherein the angle θ exceeds 180 degrees. Furthermore, as shown in FIG. 8B, when the portable electronic device in 1 is in the folded state, the rear lens 21 and the front lens 22 can be respectively retracted into the housing H of the lens module 20 toward the second side S2 and the first side S1 by the structure in the aforementioned embodiment. Simultaneously, the lens module 20 can be retracted into the frame 11 toward the front lens 22 (the first side S1) by the structure in the aforementioned embodiment. Therefore, when the portable electronic device 1 is folded, the display module 10 and the input module 30 can be tightly attached to each other, and the problems of inconvenient storage due to the object protrusion can also be avoided.

In the portable electronic device 1 of the aforementioned embodiment, the lens module 20 comprises a structure having various elastic members and various magnetic members. When the portable electronic device 1 is in the unfolded state, the rear lens 21 and the front lens protrude from the housing H, and the lens module 20 protrudes from the frame 11. Therefore, the lens module 20 can photograph the sight with wide angle, which exceeds 180 degrees. When the portable electronic device 1 is in the folded state, the rear lens 21 and the front lens 22 are retracted into the housing H, and the lens module 20 is retracted in to the frame 11. Therefore, the display module 10 and the input module 30 can be tightly attached to each other when the portable electronic device 1 is folded, and the problems of inconvenient storage due to the object protrusion can also be avoided. On the other hand, since the lens module 20 is telescopic by the arrangement of the aforementioned magnetic members, and does not need to be adjusted manually, convenient usage can be facilitated.

The description above is only of embodiments of the present the disclosure, and should not be used to limit the present disclosure. For a person skilled in the art, various changes and variations may be included in the present disclosure. The features of the embodiments may be used together and depend on the requirements, and are not limited. Any variation, equivalent replacement and improvement in the spirit and principle of the present disclosure should be protected by the present disclosure.

What is claimed is:

1. A portable electronic device, comprising:
   an input module;
   a display module, pivotally connected to the input module and configured to put the portable electronic device into an unfolded state or a folded state; and
   a lens module, disposed on the display module, comprising:
      a housing;
      a rear lens, disposed in the housing;
      a first elastic member, disposed in the housing and connected to the housing and the rear lens;
      a first magnetic member, disposed on the first elastic member; and
      a second magnetic member, disposed on the input module and corresponding to the first magnetic member;
      wherein when the portable electronic device is in the unfolded state, the first magnetic member is away from the second magnetic member, and the first elastic member pushes the rear lens to protrude from the housing by the elastic force, wherein when the portable electronic device is in the folded state, the first magnetic member is adjacent to the second magnetic member to generate the magnetic force retracting the rear lens into the housing.

2. The portable electronic device as claimed in claim 1, wherein when the portable electronic device is in the folded state, the direction of the magnetic pole of the first magnetic member is the same as the direction of the magnetic pole of the second magnetic member.

3. The portable electronic device as claimed in claim 1, wherein the lens module further comprises:
   a front lens, disposed in the housing;

a second elastic member, disposed in the housing and connected to the housing and the front lens; and a third magnetic member, disposed on the second elastic member;

wherein the portable electronic device further comprises a fourth magnetic member, disposed on the input module and corresponding to the third magnetic member;

wherein when the portable electronic device is in the unfolded state, the third magnetic member is away from the fourth magnetic member, and the second elastic member pushes the front lens to protrude from the housing by the elastic force, wherein when the portable electronic device is in the folded state, the third magnetic member is adjacent to the fourth magnetic member to generate the magnetic force retracting the front lens into the housing.

4. The portable electronic device as claimed in claim 3, wherein when the portable electronic device is in the unfolded state, the direction of the magnetic pole of the third magnetic member is opposite to the direction of the magnetic pole of the fourth magnetic member.

5. The portable electronic device as claimed in claim 3, wherein the display module comprises a frame, the lens module is movably disposed on the frame, and the portable electronic device comprises:

a third elastic member, disposed on the frame and connected to the lens module;

a fourth elastic member, disposed on the frame and connected to the lens module, wherein the third elastic member and the fourth elastic member are disposed on opposite sides of the lens module;

a fifth magnetic member, disposed on the third elastic member;

a sixth magnetic member, disposed on the input module and corresponding to the fifth magnetic member;

a seventh magnetic member, disposed on the fourth elastic member; and an eighth magnetic member, disposed on the input module and corresponding to the seventh magnetic member;

wherein when the portable electronic device is in the unfolded state, the fifth magnetic member and the seventh magnetic member are respectively away from the sixth magnetic member and the eighth magnetic member, and the third elastic member and the fourth elastic member push the lens module to protrude from the frame by the elastic forces, wherein when the portable electronic device is in the folded state, the fifth magnetic member and the seventh magnetic member are respectively adjacent to the sixth magnetic member and the eighth magnetic member to generate the magnetic forces retracting the lens module into the frame.

6. The portable electronic device as claimed in claim 5, wherein when the portable electronic device is in the folded state, the direction of the magnetic pole of the fifth magnetic member is opposite to the direction of the magnetic pole of the sixth magnetic member.

7. The portable electronic device as claimed in claim 5, wherein when the portable electronic device is in the folded state, the direction of the magnetic pole of the seventh magnetic member is opposite to the direction of the magnetic pole of the eighth magnetic member.

8. The portable electronic device as claimed in claim 5, wherein when the portable electronic device is in the unfolded state, the lens module protrudes from the frame toward the front lens by the elastic forces from the third elastic member and the fourth elastic member.

9. The portable electronic device as claimed in claim 5, wherein when the portable electronic device is in the folded state, the lens module is retracted into the frame toward the rear lens by the magnetic force between the fifth magnetic member and the sixth magnetic member and the magnetic force between the seventh magnetic member and the eighth magnetic member.

10. The portable electronic device as claimed in claim 5, wherein the first elastic member, the second elastic member, the third elastic member, or the fourth elastic member is a metal sheet.

11. The portable electronic device as claimed in claim 5, wherein the first magnetic member, the second magnetic member, the third magnetic member, the fourth magnetic member, the fifth magnetic member, the sixth magnetic member, the seventh magnetic member, or the eighth magnetic member is a permanent magnet.

* * * * *